(No Model.)

O. LINDNER.
PNEUMATIC TIRE.

No. 512,727. Patented Jan. 16, 1894.

WITNESSES:
W. H. James.
G. D. Clarke.

INVENTOR.
Otto Lindner
per Robt. C. D. Phillips
Attorney.

UNITED STATES PATENT OFFICE.

OTTO LINDNER, OF BRUSSELS, BELGIUM.

PNEUMATIC TIRE.

SPECIFICATION forming part of Letters Patent No. 512,727, dated January 16, 1894.

Application filed July 6, 1893. Serial No. 479,714. (No model.) Patented in Belgium December 10, 1892, No. 102,524.

*To all whom it may concern:*

Be it known that I, OTTO LINDNER, a subject of the King of Belgium, residing at Brussels, in the Kingdom of Belgium, have invented a new and useful Improvement in Pneumatic-Tired Wheels, (for which I have obtained a patent in Belgium, No. 102,524, bearing date of December 10, 1892,) of which the following is a specification.

My invention relates to an improvement in the construction of the cover of that type of pneumatic tire in which the cover is held and secured to the wheel rim by reason of its unstretchable edges engaging with the sides of the wheel rim on the inflation of the air tube, and it consists in rendering the edges of the cover unstretchable or circumferentially rigid by forming beads or enlargements on the edges of the cover and inclosing the said edges in a metallic case or shield, the object being to render the edges of the cover unstretchable or circumferentially rigid in a more perfect manner than is at present known. I attain this end in the manner illustrated by the accompanying drawings, in which—

Figure 1:
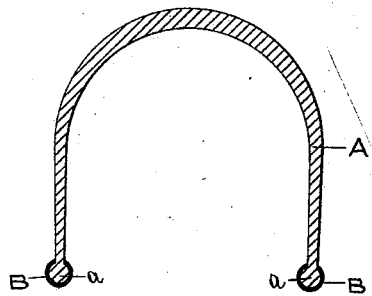
Figure 2:
Figure 3:
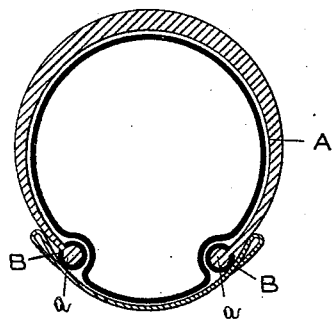
Figure 4:
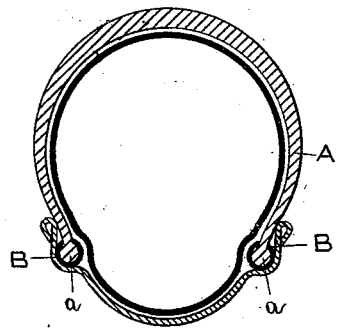

Figure 1 is a view in transverse section of the cover of a pneumatic tire embodying my invention. Fig. 2 is a view in transverse section of the metallic case shield, and Figs. 3 and 4 are views in transverse section of a pneumatic tire embodying my invention seated in wheel rims.

Similar letters denote similar parts throughout the several views.

The cover of the tire A is molded in an arch-shape in cross section and it has beads or enlargements $a$, $a$, formed on its edges. These beads or enlargements may be of any shape in cross section but preferably round. Each of the beads or enlargements $a$, $a$, is inclosed in a metallic case or shield B, which is effected by taking a hoop or ring of a gutter section, and after placing it over the beads or enlargements, closing in the edges of the said case or shield by means of suitably shaped rolls. By this construction the edges of the cover are rendered unstretchable or circumferentially rigid in a more effectual and reliable manner than by the insertion of a metallic core, or by the construction of the said beads or enlargements of hard rubber, vulcanite or the like.

The air tube C is of the usual construction and is fitted with any suitable form of valve for inflation and deflation.

The wheel rim D may be of the usual crescent shape in cross section as shown by Fig. 3, or of the shape shown by Fig. 4.

I am aware that at the date of my invention it was not broadly new and novel to make the edges of the cover of a pneumatic tire unstretchable or circumferentially rigid and I do not therefore claim such as my invention; but What I do claim as my invention, and desire to secure by Letters Patent, is—

1. The combination with a divided cover for pneumatic tires having beads or enlargements on its edges, of metallic cases or shields adapted to fit over and inclose the beads or enlargements on the edges of the cover so as to render them unstretchable or inelastic, as set forth.

2. In a pneumatic tired wheel the combination with the wheel rim, of a cover having beads or enlargements on its divided edges, of metallic cases or shields adapted to fit over and inclose the beads or enlargements on the edges of the cover, and of an air tube for inflating the tire, as set forth.

OTTO LINDNER.

Witnesses:
R. B. TURNER,
GREGORY PHELAN.